March 20, 1951     S. J. EVERETT     2,545,728
METHOD OF FORMING GLASS TUBING
Filed Feb. 27, 1946     2 Sheets-Sheet 1
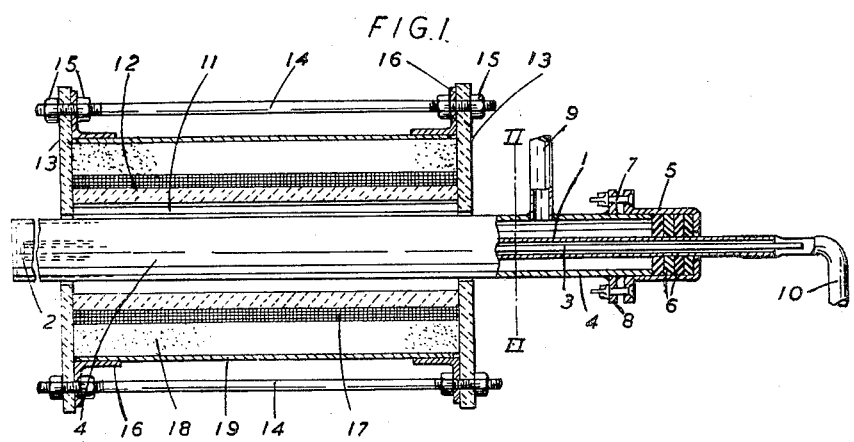
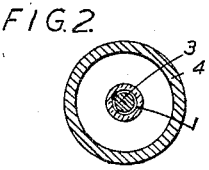
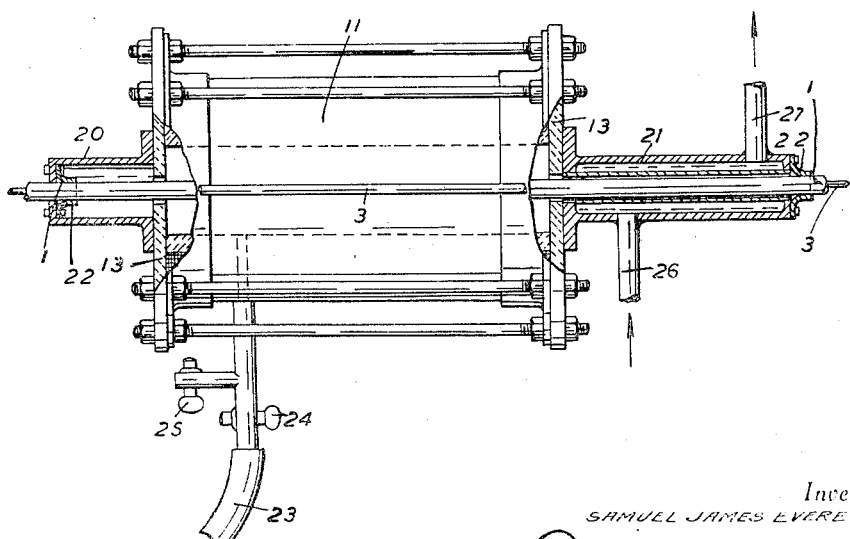
Inventor
SAMUEL JAMES EVERETT
By
Robert B. Larson
Attorney March 20, 1951 S. J. EVERETT 2,545,728
METHOD OF FORMING GLASS TUBING
Filed Feb. 27, 1946 2 Sheets-Sheet 2

Inventor
SAMUEL JAMES EVERETT,
By Robert B. Larson
Attorney

Patented Mar. 20, 1951

2,545,728

UNITED STATES PATENT OFFICE 2,545,728

METHOD OF FORMING GLASS TUBING

Samuel James Everett, Thornton Heath, England

Application February 27, 1946, Serial No. 650,419
In Great Britain March 12, 1945

8 Claims. (Cl. 49—84)

This invention relates to a method for the production of tubes of thermoplastic material and particularly of glass to be formed with a precision internal surface, that is to say, a surface which is absolutely true and smooth and is of a diameter which is accurately true to size.

This result is obtained according to the invention, by shrinking a tube, while in a plastic condition on to a mandrel by means of raised pressure acting on the outside of the tube and introducing a lubricant which is preferably a lubricating oil, between the tube and the mandrel to prevent the tube sticking to the mandrel. If necessary, oxidation of the oil is prevented by evacuating the air from the inside of the tube or by filling the tube with an inert gas such as nitrogen. The mandrel is provided with an absolutely smooth surface made accurately to size on to which the thermoplastic tube is moulded and the mandrel is of a material having a coefficient of thermal expansion greater than that of the material of the tube. The result is that as the tube and mandrel cool the mandrel contracts away from the tube and the tube may consequently be readily separated from the mandrel. Such contraction occurs longitudinally as well as radially of the tube and it is for that reason that oil which prevents the tube from sticking to the mandrel is used. In the absence of oil, the thermoplastic tube is liable to crack or even to be fractured as a result of the longitudinal contraction of the mandrel relatively to the tube. Machine oil may be used but oil as used in vacuum pumps is preferred. Moreover graphite may be employed but only in small amounts as otherwise it interferes with the accuracy of the finish of the interior of the tube.

The novel process may be employed in forming tapered or parallel tubes and tubes of circular or non-circular cross-section. If a very long length of tube is to be treated, the mandrel may consist of a plurality of lengths carefully spigotted together to present a true and continuous surface.

The tube to be treated may be glass cane which has been subjected to a preliminary stretching process to bring it to the correct condition defined in weight per foot length and to bring its internal diameter to a suitable amount in readiness for the treatment according to the invention.

In order that the invention may be clearly understood and readily carried into effect, two examples of the novel process will now be described in greater detail with reference to the accompanying drawings, in which:

Figure 1 is an axial section of the apparatus for carrying out the invention according to one method;

Figure 2 is a cross-section of the pressure casing containing the tube and mandrel, taken on the line II—II in Figure 1;

Figure 3 is a side elevation partly in axial section of a furnace and associated apparatus for carrying out a second method.

Figure 4:
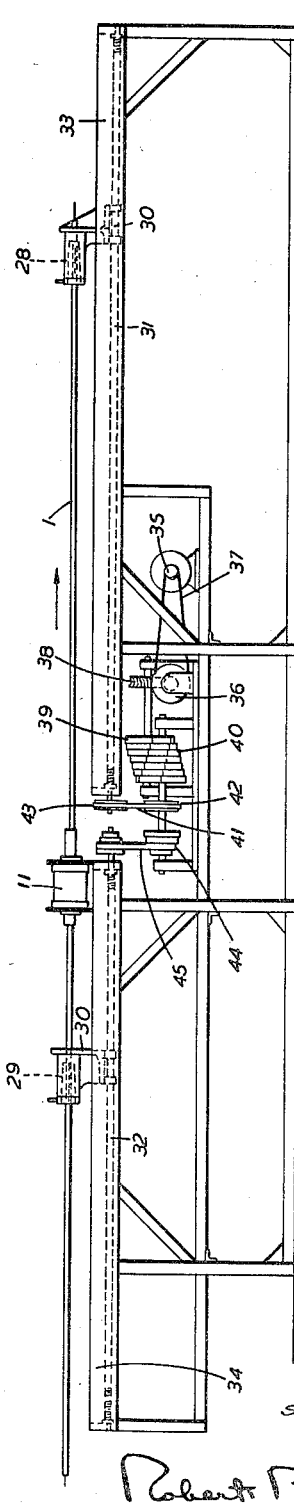
Figure 4 is a diagrammatic side elevation of the complete apparatus used for the said second method.

In the two examples selected, the tubing treated is tubing of fire-resistant glass such as that sold under the registered trade-mark "Pyrex" having a coefficient of thermal expansion of $3.5 \times 10^{-6}$ and the mandles employed are of carbon steel having a considerably higher coefficient of thermal expansion of the order to $10 \times 10^{-6}$.

In Figures 1 and 2, the glass tube 1 after its left hand end has been sealed at 2 is fitted on to a mandrel 3 which is of such a size in cross-section as very nearly to fit the tube 1 so that there is no risk of the tube 1 crumpling instead of shrinking when it is caused to contract on to the mandrel 3. Oil is then introduced into the tube 1 to prevent the latter sticking to the mandrel 3 during the shrinking process.

In this example, the tube 1 and mandrel 3 are inserted in and supported in a cylindrical steel pressure casing 4 which is rendered pressure-tight by means of a seal at its open end. This seal consists of a flanged cap 5 slidably fitting over the casing 4 with rubber discs 6 compressed between it and the end of the casing 4 by screws 7 drawing the flange of the cap 5 towards a flange 8 fitted to the casing 4. Thus the discs 6 are caused to spread inwardly and grip the tube 1. Air under pressure is conducted to the casing 4 through a connecting tube 9 while air can be evacuated from the tube 1 through a connector 10 leading to a vacuum pump.

The tube is heated in successive sections by the casing 4 being drawn from left to right in Figure 1 through a furnace 11. This is shown as a tubular electrically heated furnace having a refractory liner 12 closed by end walls 13 of asbestos board drawn together by threaded rods 14 and nuts 15, the whole being clamped to two angle rings 16. An electric heating element 17 is shown outside the liner 12 and is incased in heat insulation 18 held in place by an outer tube 19.

The pressure in the casing 4 is raised to 120 lbs. per square inch and the temperature in the furnace 11 preferably to about 650° C., although the latter may be as high as 750° C. This increased temperature reduces the time necessary to shrink the tube 1 but increases the risk of the tube 1 sticking to the mandrel 3.

After the casing 4 has been slowly moved through the furnace 11, it may be allowed to cool to 350° C. and the tube 1 removed while the mandrel 3 owing to the difference in thermal expansion between the mandrel and tube may be easily withdrawn from the tube 1.

In Figure 3, the furnace 11 is of substantially the same construction as in Figure 1 except that extensions 20, 21 are secured axially at opposite ends to the walls 13 by screws not shown. It is intended that the glass tube 1 containing the mandrel 3 shall be made to travel continuously from left to right in Figure 3 through the furnace 11 and in order that pressure may be maintained in the furnaces while the tube 1 and mandrel 3 so travel, pressure seals of rubber 22 are made to bear on the glass tube at the points of entry and exit. The air pressure is supplied to the interior of the furnace through the connecting pipe 23 from an air pump. An air admission cock 24 and a pressure release cock 25 are fitted. In this case, the tube 1 after it leaves the furnace 11 is cooled in the extension 21 which is made to serve as a water jacket and is fitted with a water inlet 26 and water outlet 27.

The tube 1 is passed through the hot zone of the furnace 11 by feeding means at both ends which may operate at the same or different speeds so that the tube 1 may be kept at the same weight per foot length during its treatment or may be stretched or compressed. The operating mechanism for the feeding means is shown diagrammatically in Figure 4. It comprises a chuck 28 gripping the tube 1 at its forward end and a similar chuck 29 gripping the tube before it enters the furnace 11. The chucks 28, 29 are carried on brackets 30 releasably engaging lead screws 31, 32 journalled in the frame members 33, 34 and prevented from axial movement. These lead screws are rotated by an electric motor 35 driving a pulley 36 through a belt 37. The pulley 36 carries a worm engaging a worm wheel 38 which is connected to the lead screw 31 through double-core pulleys 39, 40 and a further belt 41 and pulleys 42, 43. The lead screw 32 is driven at an adjustable speed through a stepped pulley 44 and belt 45.

In Figures 3 and 4, also the tube 1 may be sealed at its left hand end and evacuated at its right hand end through a flexible pipe or an inert gas may be continuously passed through it to prevent oxidation of the oil in the tube 1.

The glass tube 1 is heated up to about 700° C. in the furnace 11 in which a pressure of 3 atmospheres upwards is maintained depending on the thickness of the glass tube 1.

By the use of the present invention the glass tube may be provided with transfers or ceramic markings on the surface which are thoroughly burned in in the furnace and are not removed by boiling in alkalies or acids.

I claim:

1. In a method of forming thermoplastic glass tubing having a fine quality internal surface, the steps of placing a mandrel within a length of preformed tubing, enclosing at least a substantial portion of the external area of said tubing, heating said mandrel and enclosed tubing to an elevated temperature below the normal working temperature of the tubing and in the range of 650° C. to 750° C., and applying uniform gas pressure of at least three atmospheres to the exterior of the enclosed portion of the tubing during such heating, whereby said tubing is pressed onto the mandrel, and removing said mandrel from said tubing.

2. In a method of forming a thermoplastic glass tubing having a fine quality internal surface, the steps of placing within a length of preformed tubing a mandrel of material having a substantially greater coefficient of thermal expansion than the material of the tubing, enclosing at least a substantial portion of the external area of said tubing, heating said mandrel and tubing to an elevated temperature below the normal working temperature of the tubing and within the range of 650° to 750° C. to cause softening of the tubing and expansion of the mandrel toward the interior surface of the tubing, applying uniform gas pressure of at least three atmospheres to the exterior of the enclosed portion of the tubing during such heating to press said tubing onto the mandrel, allowing said mandrel and tubing to cool substantially to cause hardening of the tubing and shrinkage of the mandrel away from the interior of the tubing, thereby to facilitate separation of the mandrel and tubing, and removing said mandrel from said tubing.

3. In a method of forming a thermoplastic glass tubing having a fine quality internal surface, the steps of placing a mandrel within a length of preformed tubing, enclosing at least a substantial portion of the exterior surface of said tubing, applying uniform gas pressure of at least three atmospheres to said space in contact with the exterior of said tubing, and passing the enclosed tubing and mandrel through a heating zone to heat them to an elevated temperature lower than the normal working temperature and within the range of 650° C. to 750° C. of the tubing, whereby said tubing is pressed onto the mandrel and removing said mandrel from said tubing.

4. A method according to claim 3, in which said tubing is withdrawn from said heating zone faster than the tubing and mandrel are fed to the heating zone, thereby drawing said tubing onto said mandrel and reducing the weight per foot of the tubing.

5. A method according to claim 1 in which the tubing is heated to about 650° C. and said fluid pressure is exerted by a gas under a pressure of about 120 pounds per square inch.

6. A method according to claim 2, including the step of evacuating the interior of said tubing during the application of heat and pressure.

7. A method of forming glass tubing having a fine quality internal surface, comprising the steps of enclosing a heating zone, pressurizing said heating zone to a pressure of at least three atmospheres while maintaining said zone at a temperature of 650-750° C., placing within a length of preformed glass tubing a mandrel of a material having a greater coefficient of thermal expansion than the glass, passing said tubing and mandrel through said pressurized heating zone to heat the tubing and mandrel and to expose the exterior of said tubing to the pressure in said zone, whereby said tubing is pressed tightly onto said mandrel, permitting said mandrel and tubing to cool after removal from the heating zone, whereby the differences in coefficient of thermal expansion of said mandrel and the tubing cause their separation, and then removing said mandrel from said tubing.

8. A method of forming glass tubing having a fine quality internal surface, comprising the steps of enclosing a heating zone, pressurizing said heating zone to a pressure of at least three atmospheres while maintaining said zone at a temperature of 650°–750° C., placing within a length of preformed glass tubing a mandrel of a material having a greater coefficient of thermal expansion than the glass, passing said tubing and mandrel through said pressurized heating zone to heat the tubing and mandrel and to expose the exterior of said tubing to the pressure in said zone whereby said tubing is pressed onto said mandrel, passing said mandrel and tubing through an enclosed cooling liquid, and then removing said mandrel from said tubing.

SAMUEL JAMES EVERETT.

REFERENCES CITED

The following references are of record in the file of this patent:

UNITED STATES PATENTS

| Number | Name | Date |
|---|---|---|
| 1,301,714 | Keuppers | Apr. 22, 1919 |
| 1,583,464 | Housekeeper | May 4, 1926 |
| 2,084,811 | Keen | June 22, 1937 |
| 2,286,401 | Everett | June 16, 1942 |
| 2,373,816 | De Roche et al. | Apr. 17, 1945 |
| 2,393,979 | Everett | Feb. 5, 1946 |
| 2,426,341 | Canfield | Aug. 26, 1947 |